July 1, 1952 — C. H. WELCH ET AL — 2,602,105
BATTERY TERMINAL CONNECTION
Filed Dec. 17, 1949
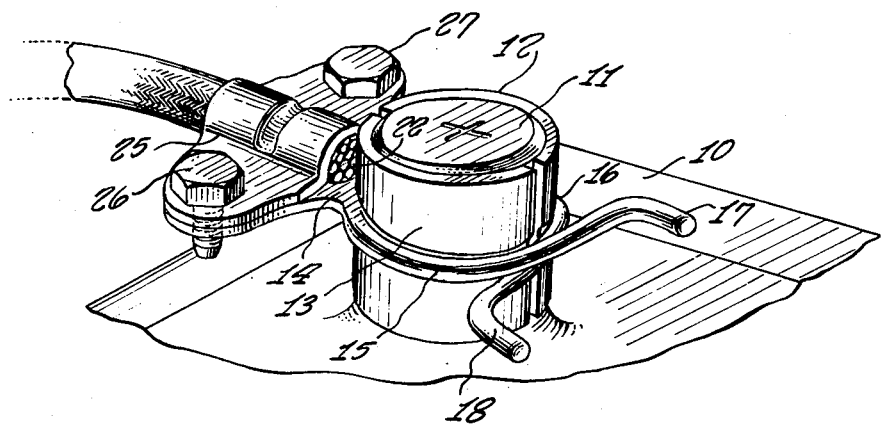
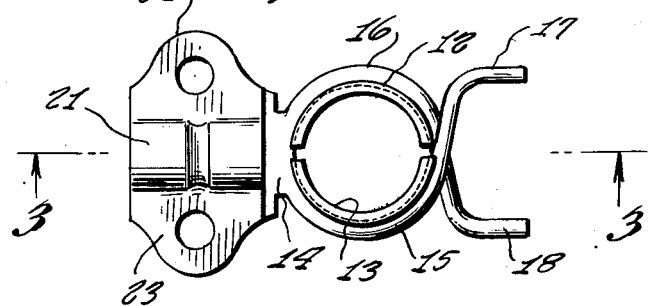
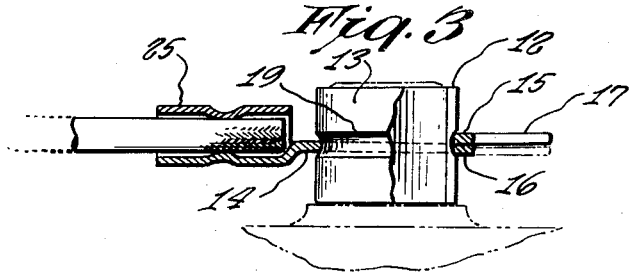
INVENTORS
CHARLES H. WELCH
& JAMES M. WELCH
BY
Carl Miller
ATTORNEY Patented July 1, 1952

2,602,105

UNITED STATES PATENT OFFICE 2,602,105

BATTERY TERMINAL CONNECTION

Charles H. Welch and James M. Welch,
Staten Island, N. Y.

Application December 17, 1949, Serial No. 133,616

1 Claim. (Cl. 173—259)

This invention relates to a battery terminal connection.

It is an object of the present invention to provide a battery terminal connection wherein no nut and bolt is required or the corrosion of the same has to be tampered with on making the connection or on the removal of the terminal and which, upon seeking the removal of the terminal requiring a cutting of the bolt or similar operation, often destroys the battery post or loosens it so that the battery is spoiled.

It is another object of the present invention to provide a battery terminal connection wherein quick installation or quick removal of the terminal can be effected.

Other objects of the present invention are to provide a battery terminal connection which is of simple construction, is inexpensive to manufacture, has a minimum number of parts, consumes little space, is easy to operate and efficient in operation.

For other objects and for a better understanding of the invention, reference may be had to the following detailed description taken in connection with the accompanying drawing, in which:

Fig. 1 is a perspective view of the battery terminal connection made secure to a battery post.

Fig. 2 is a top plan view of the terminal connection disconnected from the cable.

Fig. 3 is a longitudinal sectional view taken on line 3—3 of Fig. 2.

Referring now to the figures, 10 represents a storage battery having an upstanding post 11. The terminal connection includes shims 12 and 13 adapted to fit about the post 11 and a gripping member 14 having springable projections 15 and 16 having respectively handles 17 and 18 thereon. The handles are compressed to release the terminal 18 and shims 12 and 13 from the post 11. The shims 12 and 13 respectively have grooves 19 for receiving the springable portions 15 and 16.

The connector 14 is recessed at 21 to receive cable wires 22 and has wing portions 23 and 24. A clamp plate 25 is extended over the cable wires 22 and made secure to the wing portions 23 and 24 by bolts 26 and 27.

In operation, the handles 17 and 18 are squeezed so as to enlarge the space between the projections 15 and 16 and to allow the projections 15 and 16 to be extended downwardly over the shims 12 and 13. Upon release of the projections 15 and 16, the shims will be clamped against the post 11.

The parts can be either cadmium or lead coated and the terminal member 14 and spring projections are formed of tempered steel to retain the proper pressure upon the shims. It will be seen that there is no nut and bolt arrangement to corrode or to tamper with and remove. Where there is corrosion, the shim units can be easily removed to leave a clean post and other shims can be added. Accordingly, the installation can be made quickly and without special tools.

While various changes may be made in the detail construction, it shall be understood that such changes shall be within the spirit and scope of the present invention as defined by the appended claim.

Having thus set forth and disclosed the nature of our invention, what is claimed is:

A battery terminal connection comprising semi-cylindrical shims adapted to be placed about a battery terminal post, a terminal member having spring projections curved and opposingly engaging respective shims and means for clamping cable wires to the terminal member, said shims having recesses therein receiving the spring projections, said spring projections having handle portions thereon and adapted to be squeezed to release the spring projections from the recesses of the shims.

CHARLES H. WELCH.
JAMES M. WELCH.

REFERENCES CITED

The following references are of record in the file of this patent:

UNITED STATES PATENTS

| Number | Name | Date |
|---|---|---|
| 910,842 | McIntyre | Jan. 26, 1909 |
| 1,759,043 | Derby | May 20, 1930 |
| 1,976,649 | Aoki | Oct. 9, 1934 |
| 2,039,669 | Tenney | May 5, 1936 |
| 2,068,544 | Hahn | Jan. 19, 1937 |
| 2,128,888 | Pierpoint | Aug. 30, 1938 |
| 2,180,271 | Arras | Nov. 14, 1939 |
| 2,195,900 | Orahood et al. | Apr. 2, 1940 |
| 2,239,812 | Urzaiz | Apr. 29, 1941 |